United States Patent
Jonas et al.

(10) Patent No.: US 9,541,385 B2
(45) Date of Patent: Jan. 10, 2017

(54) MEASUREMENT METHOD AND APPARATUS

(75) Inventors: Kevyn Barry Jonas, Clevedon (GB); Geoffrey McFarland, Wotton-under-Edge (GB); Peter Russell Hammond, Warkworth (GB); Anthony Brown, Alnwick (GB)

(73) Assignees: RENISHAW PLC, Wotton-under-Edge (GB); METROLOGY SOFTWARE PRODUCTS LIMITED, Alnwick (GB)

( * ) Notice: Subject to any disclaimer, the term of this patent is extended or adjusted under 35 U.S.C. 154(b) by 335 days.

(21) Appl. No.: 13/581,557

(22) PCT Filed: Mar. 4, 2011

(86) PCT No.: PCT/GB2011/000300
§ 371 (c)(1),
(2), (4) Date: Aug. 28, 2012

(87) PCT Pub. No.: WO2011/107746
PCT Pub. Date: Sep. 9, 2011

(65) Prior Publication Data
US 2012/0323345 A1     Dec. 20, 2012

(30) Foreign Application Priority Data
Mar. 4, 2010 (GB) .................................. 1003599.6

(51) Int. Cl.
G05B 19/18     (2006.01)
G01B 21/04     (2006.01)

(52) U.S. Cl.
CPC .................. G01B 21/045 (2013.01)

(58) Field of Classification Search
USPC ........................................ 700/177, 189, 195
See application file for complete search history.

(56) References Cited

U.S. PATENT DOCUMENTS

| 5,426,861 A | 6/1995 | Shelton |
| 5,627,771 A | 5/1997 | Makino |

(Continued)

FOREIGN PATENT DOCUMENTS

| CN | 1856690 A | 11/2006 |
| CN | 1894556 A | 1/2007 |

(Continued)

OTHER PUBLICATIONS

Trenk et al., "The "Virtual CMM" a software tool for uncertainty evaluation—practical application in an accredited calibration lab" In Proc. of ASPE: Uncertainty Analysis in Measurement and Design 2004, 6 pages.*

(Continued)

*Primary Examiner* — Mohammad Ali
*Assistant Examiner* — Emilio J Saavedra
(74) *Attorney, Agent, or Firm* — Oliff PLC

(57) ABSTRACT

An error correction method for coordinate positioning apparatus is described. The method comprises (i) taking a first data set comprising one or more first data values, each first data value describing a position on the surface of a first object, (ii) taking a second data set comprising one or more second data values, each second data value describing a position on the surface of the first object, and (iii) calculating an error map comprising one or more error values, each error value describing a positional difference between the surface as described by the first data set and the surface as described by the second data set. The surface normal of the first object is known at each position described by each first data value and step (iii) comprises calculating each error value by determining the positional difference substantially in the direction of the known surface normal.

20 Claims, 7 Drawing Sheets

(56) References Cited

U.S. PATENT DOCUMENTS

Figure 1:
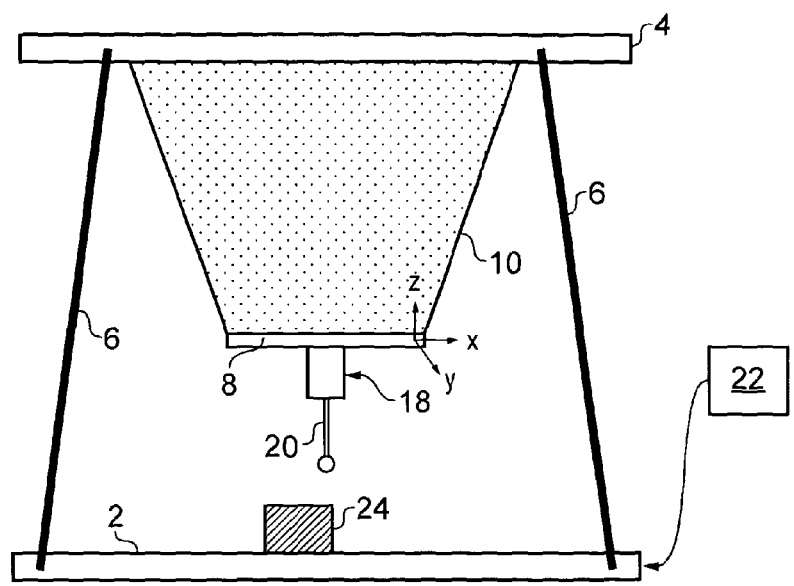

| | | | |
|---|---|---|---|
| 6,434,846 B1* | 8/2002 | McMurtry | G01B 21/042 |
| | | | 33/502 |
| 7,079,969 B2 | 7/2006 | Taylor et al. | |
| 7,318,284 B2 | 1/2008 | McMurtry et al. | |
| 7,568,373 B2 | 8/2009 | McMurtry et al. | |
| 2003/0009257 A1* | 1/2003 | Sutherland et al. | 700/195 |
| 2004/0055170 A1 | 3/2004 | Grzesiak et al. | |
| 2004/0189944 A1 | 9/2004 | Kaufman et al. | |
| 2005/0213108 A1* | 9/2005 | McMurtry | G01B 21/045 |
| | | | 356/609 |
| 2005/0283989 A1* | 12/2005 | Pettersson | 33/502 |
| 2006/0053646 A1* | 3/2006 | McFarland | G01B 21/045 |
| | | | 33/503 |
| 2008/0083127 A1 | 4/2008 | McMurtry et al. | |
| 2009/0307915 A1* | 12/2009 | Sutherland | 33/502 |

FOREIGN PATENT DOCUMENTS

| | | |
|---|---|---|
| EP | 1 818 647 A2 | 8/2007 |
| JP | H07-21238 A | 1/1995 |
| JP | 2002-541469 A | 12/2002 |
| JP | 2005-519277 A | 6/2005 |
| JP | 2006-509194 A | 3/2006 |
| JP | 2007-515638 A | 6/2007 |
| JP | 2008-511454 A | 4/2008 |
| WO | WO 2004/005849 A1 | 1/2004 |
| WO | WO 2006/024844 A2 | 3/2006 |

OTHER PUBLICATIONS

Aug. 26, 2014 Office Action issued in Japanese Application No. 2012-555484.
Office Action issued in Chinese Patent Application No. 201180012239.5 dated Jun. 19, 2014 (with partial translation).
International Search Report issued in International Application No. PCT/GB2011/000300 dated Jun. 28, 2011.
Written Opinion of the International Searching Authority issued in International Application No. PCT/GB2011/000300 dated Jun. 28, 2011.
British Search Report and Examination Opinion issued in British Application No. 1003599.6 dated Mar. 30, 2010 and Mar. 31, 2010, respectively.
Jun. 16, 2015 Office Action issued in Japanese Application No. 2012-555484.
Apr. 30, 2015 Office Action issued in Chinese Application No. 201180012239.5.
Jul. 5, 2016 Office Action issued in Japanese Application No. 2012-555484.

* cited by examiner

MEASUREMENT METHOD AND APPARATUS

The present invention relates to an improved apparatus and method for correcting errors associated with measurements taken using coordinate positioning apparatus, such as coordinate measuring machines (CMMs) or machine tools.

Coordinate positioning apparatus, such as coordinate measuring machines (CMMs) and numerically controlled machine tools, are well known and widely used in industrial inspection processes. In particular, it is known to use coordinate positioning apparatus to measure the position of multiple points on the surface of a part (e.g. a workpiece) to ascertain if it has been manufactured to within desired tolerances. Measurements acquired with any coordinate positioning apparatus will always have a certain level of uncertainty and many different calibration techniques have been developed over the years to improve the accuracy with which the position of points on the surface of a part can be measured.

One type of calibration or correction method that is known for coordinate positioning apparatus comprises the generation of an error map that describes the difference between two sets of measurements of the same object. U.S. Pat. No. 7,079,969, for example, describes creating an error map that describes the difference between calibrated measurements of an artefact and measurements of that artefact taken at high speed using coordinate measuring apparatus. It is also described in U.S. Pat. No. 5,426,861 how an error map may be established that describes the difference between measurements taken using a reference CMM placed in a clean room and measurements taken using a shop floor CMM. Once created, such error maps are used to correct subsequent measurements.

WO2006/024844 describes a method for aligning the coordinate system of computer aided design (CAD) data with the coordinate system of a machine tool. This is based on iteratively adjusting the alignment of the CAD and machine tool coordinate systems to minimise the positional differences between CAD and measured data points for the same part. WO2006/024844 does not, however, describe producing any kind of error map that is used to correct subsequent measurements.

Although known error map based correction methods of the type described in U.S. Pat. Nos. 7,079,969 and 5,426,861 are useful in many instances, it has been found by the present inventors that such techniques have a number of disadvantages. In particular, generating an error map describing the difference between data points contained in two data sets has proven prone to error due to problems associated with matching data sets.

According to a first aspect of the present invention, an error correction method for coordinate positioning apparatus is provided that comprises the steps of (i) taking a first data set comprising one or more first data values, each first data value describing a position on the surface of a first object, (ii) taking a second data set comprising one or more second data values, each second data value describing a position on the surface of the first object, and (iii) calculating an error map comprising one or more error values, each error value describing a positional difference between the surface as described by the first data set and the surface as described by the second data set, wherein the surface normal of the first object is known at each position described by each first data value and step (iii) comprises calculating each error value by determining the positional difference substantially in the direction of the known surface normal, characterised by the method comprising the further step of (iv) performing a processing or measurement operation on the first object, or an object nominally identical to the first object, in which positions on the surface thereof are corrected using the error map calculated in step (iii).

The present invention thus comprises an error correction method for use with coordinate positioning apparatus. In step (i) of the method, a first data set is taken that comprises one or more first data values or, more preferably, a plurality of first data values. Taking the first data set may comprise retrieving or accessing a previously determined first data set or generating a first data set (e.g. by taking measurements of the first object). As explained in more detail below, the first data values of the first data set may be derived from measurements of the first object (e.g. acquired using a reference coordinate positioning apparatus) or from design data associated with the first object.

Step (ii) of the method comprises taking a second data set that comprises one or more second data values or, more preferably, a plurality of second data values. Taking the second data set may comprise retrieving or accessing a previously determined second data set or generating a second data set (e.g. by taking measurements of the first object). Each second data value describes a position (e.g. of a point, plane or feature) on the surface of a first object but the first and second data sets are preferably generated in different ways; for example, the first and second data sets may be derived from measurements of the first object taken using different measurement processes and/or different measurement apparatus.

In step (iii) of the method an error map is calculated that describes the positional differences between the surface as described by the first data set and the surface as described by the second data. The error map generated in step (iii) comprises one or more error values or, more preferably, a plurality of error values. As described in more detail below, step (iii) may comprise finding the positional difference between corresponding first and second data values of the first and second data sets. Alternatively, step (iii) may comprise finding the positional difference between a first data value and the point at which the surface normal associated with the first data value intersects the surface defined by the second data set.

In step (iv) of the method of the present invention, the error map that has been calculated in step (iii) is used to correct a subsequent measurement of the first object (or an object nominally identical to the first object) or to adjust subsequent processing (e.g. machining) operations that are performed on the first object (or an object nominally identical to the first object). In particular, points on the surface of the first object (or an object nominally identical to the first object) are corrected using the error values contained in the error map. This correction may comprise updating measured points to include the error values or adjusting machining instructions to account for the error values when defining the surface of the object during a machining process. It should be noted the step of performing processing operations on an object nominally identical to the first object includes performing a processing operation on a blank or part-made object that is intended to form an object nominally identical to the first object.

In accordance with the present invention, the surface normal is known at each position that is defined by the one or more first data values. The surface normal may be known from knowledge of the geometry of the first object or it may be measured (e.g. if the first object has a freeform surface). Step (iii) of the method comprises calculating each error value (e.g. the difference in position between a first data value and a second data value) substantially in the direction of this known surface normal. These error values are then used to correct subsequent measurements of, or processes performed on, the first object or an object nominally identical to the first object.

As outlined above, it is described in documents such as U.S. Pat. Nos. 5,426,861 and 7,079,969 how data sets can be compared to establish an error map. Such prior art methods have the disadvantage, however, of merely establishing the magnitude of the positional separation of corresponding points in different data sets. The present invention has the advantage that, by establishing a positional difference along known surface normal directions, the error values that are generated provide an improved description of the error or positional difference between the surfaces described by the first and second data sets. This has been found to provide data having increased positional accuracy when the error map is used to correct subsequently acquired data.

Conveniently, step (iv) of the method comprises the steps of taking a further object that is nominally identical to the first object and using a coordinate positioning apparatus to measure the further object. Advantageously, the error map generated in step (iii) of the method can then be used to correct the measurements of the further object. In other words, the present invention may provide an improved method for reducing errors in the measurement of a series of nominally identical objects using an error map generated using a first object in that series.

Alternatively, the error map generated in step (iii) of the method may be fed into a subsequent processing step. For example, step (iv) of the method may comprise the step of performing a processing operation to alter the surface shape of the first object or an object nominally identical to the first object. The error map is preferably used to adjust the surface shape produced by the processing operation. The processing operation may include any operation that alters the first object itself. The processing operation may alternatively comprise altering other objects or forming new objects (e.g. from blanks) that are nominally identical to the first object. Advantageously, the processing operation includes a machining process. The machining process may comprise material removal; e.g. by milling, turning, grinding, forming (e.g. laser or glass forming), laser ablation or electro discharge machining. The processing operation may comprise the alteration of material of the first object or objects nominally identical to the first object; e.g. by surface melting etc. The processing operation may comprise the deposition of material. For example, the processing operation may comprise a rapid prototyping or rapid manufacturing technique (e.g. 3D printing, selective laser sintering, stereolithography and laminated object manufacturing) that adds material to the first object or an object nominally identical to the first object.

Advantageously, the method comprises the step of generating the one or more first data values and/or the one or more second data values using an interpolation or other suitable process that ensures each second data value lies on the known surface normal of a first data value. Each error value calculated in step (iii) may then comprise the positional difference between a first data value and its associated second data value along the known surface normal.

Instead of using an interpolation process to generate appropriately aligned first and second data values, other techniques could be employed. For example, a method could be used that comprises projecting a plurality of second data values along the surface normal of a first data value and establishing which projection is closest to that first data value. The method may thus comprise, for each of a plurality of first data values, any one or more of the steps of defining a plane that includes a first data value and is orthogonal to the known surface normal thereof; projecting at least some of the second data values along the known surface normal of the first data value and determining the position at which the second data value projections intersect the defined plane; establishing which one of the second data value projections intersects the defined plane at an intersection point that is closest to the selected first data value; and calculating the error value from the positional difference between the closest intersection point and the associated second data value from which it was projected.

Any suitable measuring apparatus may be used to produce the first and/or second data sets. Preferably, the method comprises the step of using at least one coordinate positioning apparatus to measure the first object. The at least one coordinate positioning apparatus may comprise a coordinate measuring machine, inspection robot, machine tool etc. Conveniently, the coordinate positioning apparatus comprises a measurement probe. The measurement probe may be a contact probe having an object contacting stylus or a non-contact (e.g. inductive, capacitive, optical etc) probe. The measurement probe may be a touch trigger probe that issues a trigger signal when moved into a certain relationship relative to a surface or an analogue probe (also called a scanning probe) that measures the position of a point on the surface of an object relative to the probe body in a local coordinate system.

Advantageously, the at least one coordinate positioning apparatus is arranged to measure (e.g. using the measurement probe) the position of a plurality of points on the surface of the first object. Preferably, at least one of the first data set and the second data set are derived from measurements of the first object taken using the at least one coordinate positioning apparatus. As described below, the first and second data sets may be derived from measurements taken on different coordinate positioning apparatus. Alternatively, one of the first and second data sets may be derived from measurements of the first object taken on a coordinate positioning apparatus whilst the other data set is derived from design data (e.g. CAD data) describing the first object.

Conveniently, the method comprises the step of using a first coordinate positioning apparatus comprising a measurement probe to measure the position of a plurality of points on the surface of the first object. The first data set may then be advantageously derived from measurements of the first object taken using the first coordinate positioning apparatus. The first data values of the first data set may comprise the raw positional data generated by the first coordinate positioning apparatus. Advantageously, the method comprises the step of processing the raw positional data generated by the first coordinate positioning apparatus to provide the first data values. Such a processing step may comprise fitting the raw positional data to a certain shape or function, filtering (e.g. smoothing) the data, averaging the data and/or interpolating the data.

It is preferred that the first coordinate positioning apparatus is calibrated. The calibration may be to a traceable or reference standard; the first coordinate positioning apparatus may thus be considered as a reference measurement apparatus. Advantageously, the first coordinate positioning apparatus is a coordinate measurement machine (CMM) that is dedicated to measurement; the CMM may then be located in a clean, temperature controlled, environment away from the production line. In a preferred embodiment the first coordinate positioning apparatus comprises a serial CMM; for example, a bridge or gantry type CMM in which motion of a quill holding the measurement probe is built up from multiple (e.g. three) axes of linear movement.

As outlined above, the method of the present invention comprises establishing a positional difference substantially along the surface normal direction at the position defined by each first data value. The known surface normal of the first object at the position defined by each first data value may be inherent from the geometry of the first object, defined using design data describing the first object, or it may be determined (e.g. calculated/measured) at the position of each first data point.

Advantageously, the method comprises the step of calculating the surface normal of the first object at each position described by each first data value using the points measured on the surface of the first object by the first coordinate positioning apparatus. In other words, measurements of the first object taken using the first coordinate positioning apparatus may be used to establish the surface normal direction at each position described by a first data value. The surface normal data may, for example, be derived before, during or after a filtering process that is used to generate the first data values from the raw measurement data. In such an example, the one or more first data values may be derived from the same measurements that are used to establish the surface normal. Alternatively, a separate step may be performed of analysing the first data values to determine the surface normal directions. Such methods are preferred when the first object has a so-called freeform surface.

Conveniently, the first object has a known geometric form; for example, the first object may be of a standard geometric form or the geometric form may be known from design data related to the first object. The first object may also comprise one or more datum features or surfaces. The method may then comprise the step of using the first coordinate positioning apparatus to perform a datuming operation to establish the orientation of the first object such that the surface normal of the first object is known at each position described by each first data value. Such a datuming step effectively enables a local or part coordinate system to be established thereby providing the necessary surface normal information from the known geometric form information. Such a datuming step may be performed using data from the first coordinate positioning apparatus that is used to derive the first data set, or the datuming step may comprise a different series of measurements of the first object.

As explained above, the first and/or second data sets may be derived from physical measurements of the first object. Alternatively, at least one of the first data set and the second data set may be conveniently derived from design data of the object. The design data may comprise computer aided design (CAD) data or similar. In other words, design data that has not been derived from a physical measurement of the first object may be used to generate the first and/or second data set. Such design data may also or alternatively be used to provide surface normal information.

Advantageously, the method comprises the step of using a second coordinate positioning apparatus to measure the position of a plurality of points on the surface of the first object. Preferably, the second coordinate positioning apparatus is used to measure substantially the same part of the first object as the first coordinate positioning apparatus. The first and second coordinate positioning apparatus may measure points at the same or different densities and/or distributions. The second coordinate positioning apparatus may be of similar, or different, type to the first coordinate positioning apparatus described above. Preferably, the second coordinate positioning apparatus comprises a measurement probe as described above. Advantageously, the second data set is derived from measurements of the first object taken using the second coordinate positioning apparatus.

The second data values of the second data set may comprise the raw positional data generated by the second coordinate positioning apparatus. Advantageously, the method comprises the step of processing the raw positional data generated by the second coordinate positioning apparatus to provide the second data values. Such a processing step may comprise fitting the raw positional data to a certain shape or function, filtering (e.g. smoothing) the data, averaging the data and/or interpolating the data. A similar processing step may be performed to generate the second data set that was used to generate the first data set.

The second coordinate positioning apparatus conveniently comprises a parallel coordinate positioning apparatus. The parallel coordinate positioning apparatus may comprise a base platform connected to a moveable platform by a plurality of extendable struts or legs. Extension of the struts together (i.e. in parallel) produces the required motion of the moveable platform (e.g. in x, y and z directions). This should be contrasted to serial coordinate positioning apparatus of the type describe above in which linear motions along multiple (e.g. three) mutually orthogonal linear axes is achieved by mounting linear slides in series.

Advantageously, step (ii) comprises using an interpolation process to calculate the one or more second data values from the position of a plurality of points on the surface of the first object measured by the second coordinate positioning apparatus. Preferably, each second data value calculated in step (ii) is arranged to lie on the surface normal of a first data value. In other words, data collected by the second coordinate positioning apparatus that describes the surface profile of the first object is interpolated to provide the second data values that lie on the surface of the first object and also intersect the surface normal associated with the first data values.

Once calculated, the error map of step (iii) can be used to correct measurements taken on objects that are nominally identical to the first object. In particular, the error values of the error map may, as appropriate, be added to or subtracted from acquired measurements to provide corrected measurements. Advantageously, the method comprises the additional step of using the second coordinate positioning apparatus to measure at least one further object that is nominally identical to the first object, wherein the measurements of the at least one further object using the second coordinate positioning apparatus are corrected using the error map calculated in step (iii). The error map based correction may be applied after an appropriate processing step is applied to the raw measurement data that is collected from the further object. Such a processing step may comprise fitting the raw positional data to a certain shape or function, filtering (e.g. smoothing) the data, averaging the data and/or interpolating the data (e.g. to provide data points that lie on the surface normal data of the error map).

Although deriving a single error map is described above, the method may also comprise calculating a plurality of error maps to map between three or more different data sets. This may allow, for example, a first error map to be generated for mapping between design data and data from a calibrated (reference) CMM and a second error map to be generated for mapping between the calibrated (reference) CMM and a further coordinate positioning apparatus. The method may thus comprise taking a third data set comprising one or more third data values, each third data value describing a position on the surface of the first object. Advantageously, the step may then be performed of calculating a second error map comprising one or more error values, each error value describing a positional difference between a second data value and a third data value. Preferably, said positional difference is determined substantially in the direction of the known surface normal associated with the first data value.

A computer program may also be provided to implement the above described method. A computer program carrier, such as an optical disk (e.g. a CD or DVD) or a flash memory device, may store the computer program. A computer programmed to implement the method may also be provided. A coordinate positioning apparatus comprising a computer controller may also be provided, wherein the computer controller is programmed to perform a method according to the first aspect of the invention.

An error correction method for coordinate positioning apparatus is also described herein that comprises the steps of; (a) taking an error map calculated for a first object using a method described herein, wherein one of the first data set and second data set used when calculating the error map are derived from measurements taken using a coordinate positioning apparatus, (b) taking a further object that is nominally identical to the first object and using the coordinate positioning apparatus to measure the further object, and (c) using the error map of step (a) to correct the measurements of the further object taken in step (b).

A coordinate positioning apparatus is described herein that comprises a computer controller, wherein the computer controller stores an error map calculated for a first object using a method as described herein, wherein one of the first data set and second data set used to calculate the error map are derived from measurements taken using the coordinate positioning apparatus.

Also outlined herein is an error correction method for coordinate positioning apparatus that comprises the steps of; (i) taking a first data set comprising one or more first data values, each first data value describing a position on the surface of a first object, (ii) taking a second data set comprising one or more second data values, each second data value describing a position on the surface of the first object, and (iii) calculating an error map comprising one or more error values, each error value describing a positional difference between the surface as described by the first data set and the surface as described by the second data set, wherein the surface normal of the first object is known at each position described by each first data value and step (iii) comprises calculating each error value by determining the positional difference substantially in the direction of the known surface normal. Any of the above described steps may be used in such a method.

Figure 2:
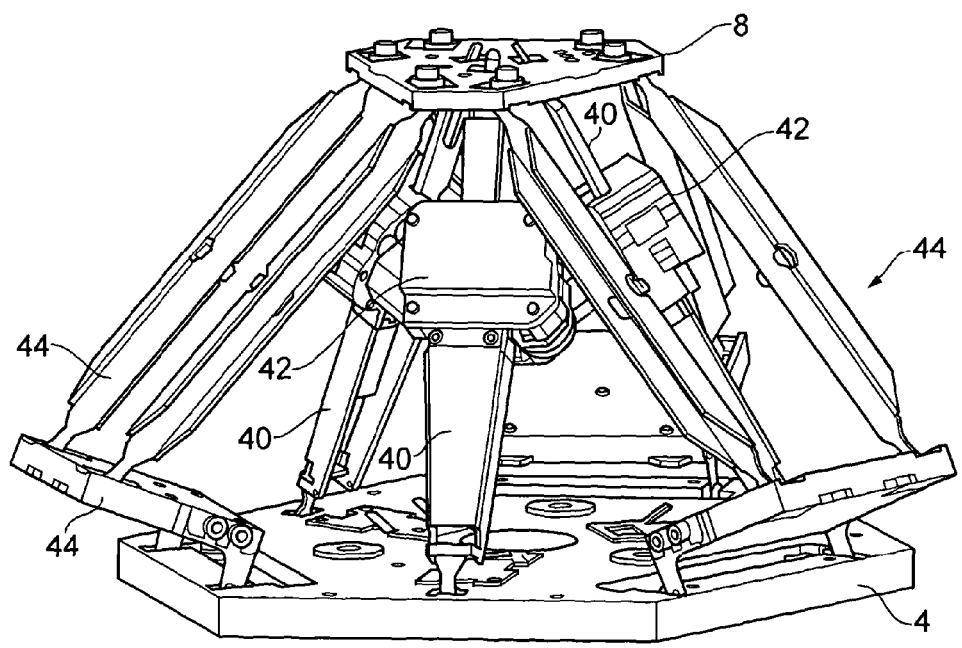
Figure 3:
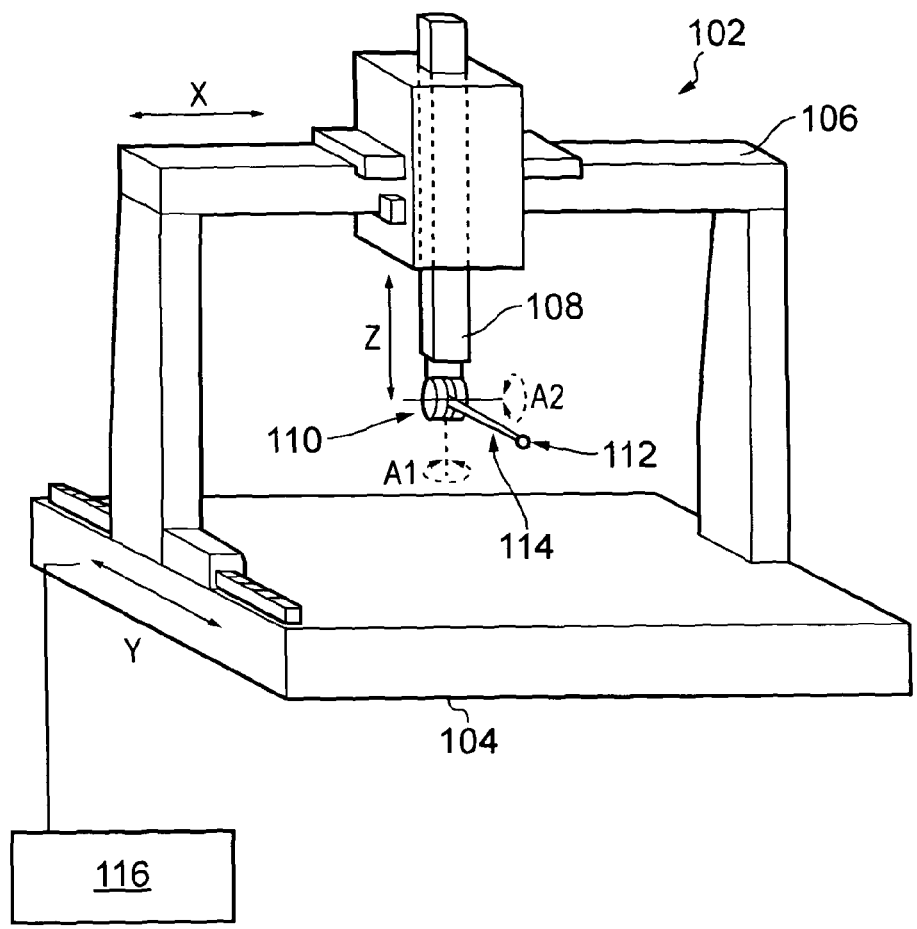
Figure 4:
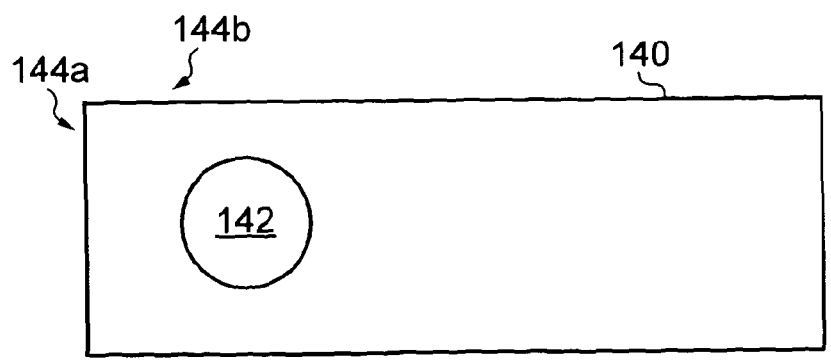
Figure 5A:
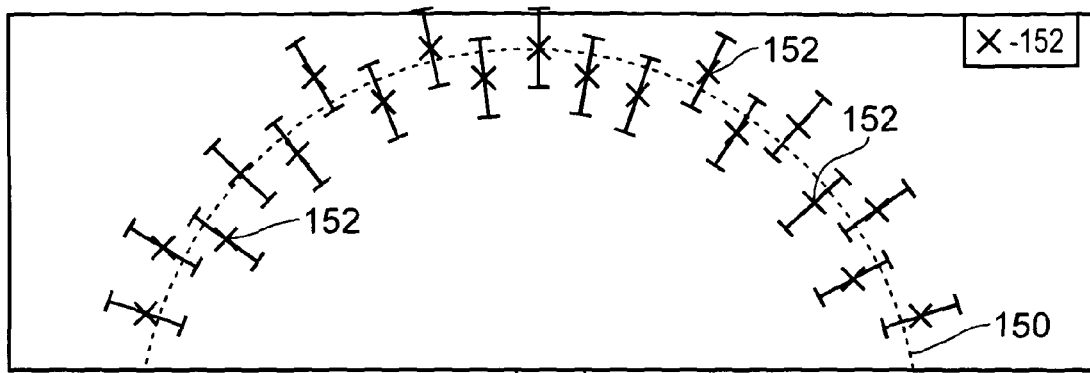
Figure 5B:
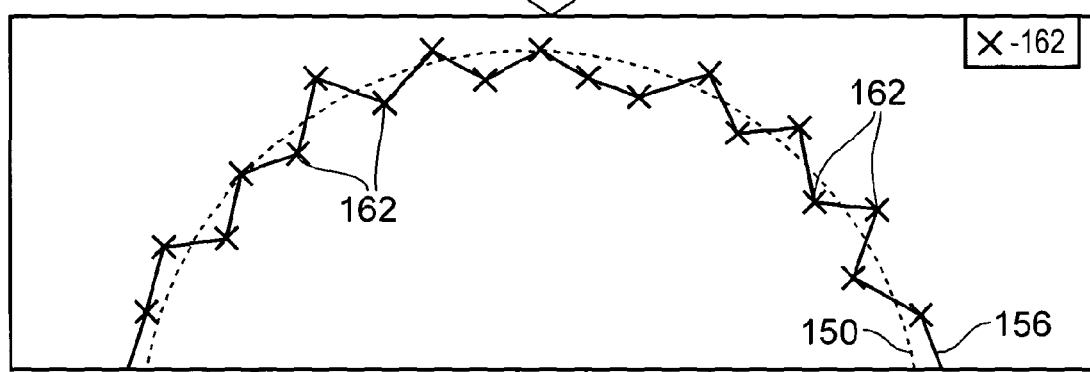
Figure 5C:
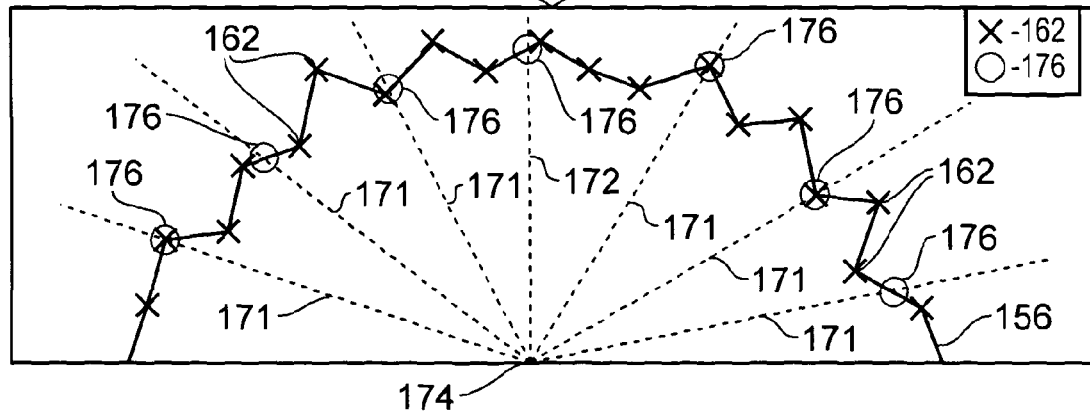
Figure 6:
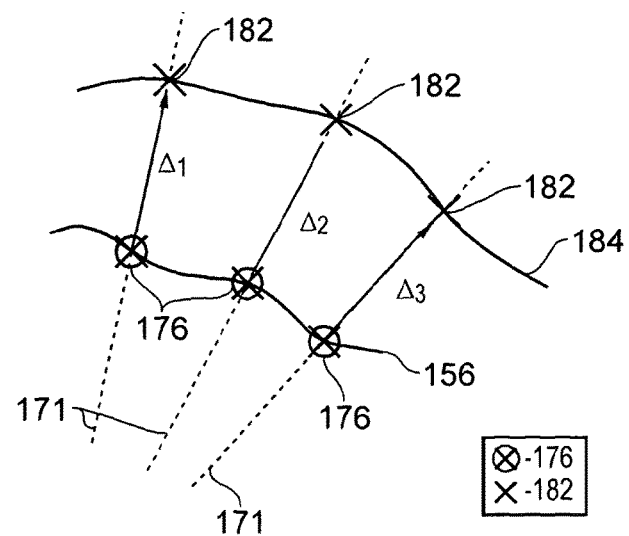
Figure 7:
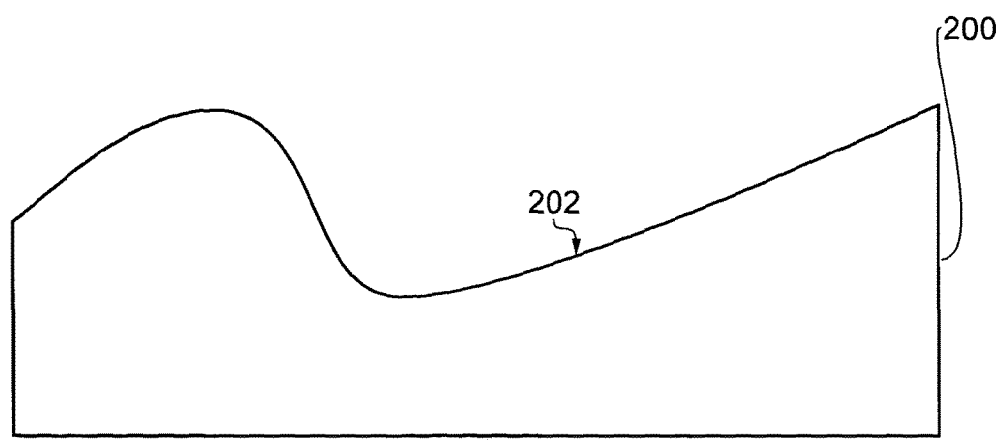
Figure 8A:
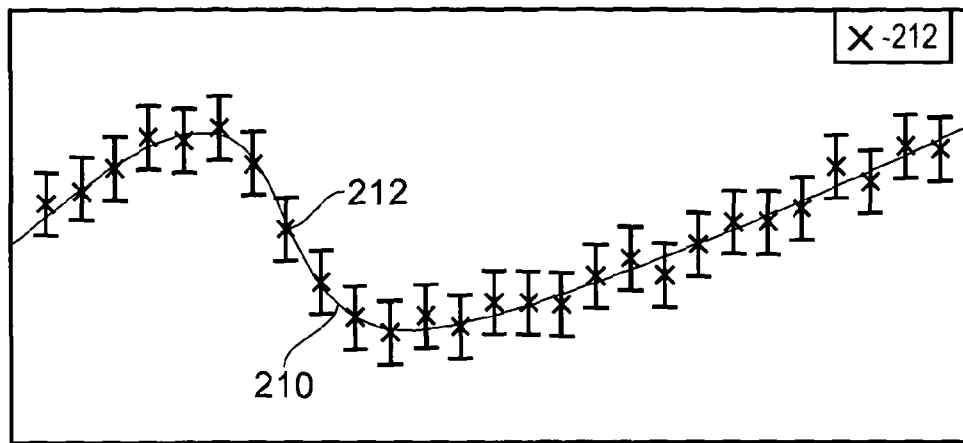
Figure 8B:
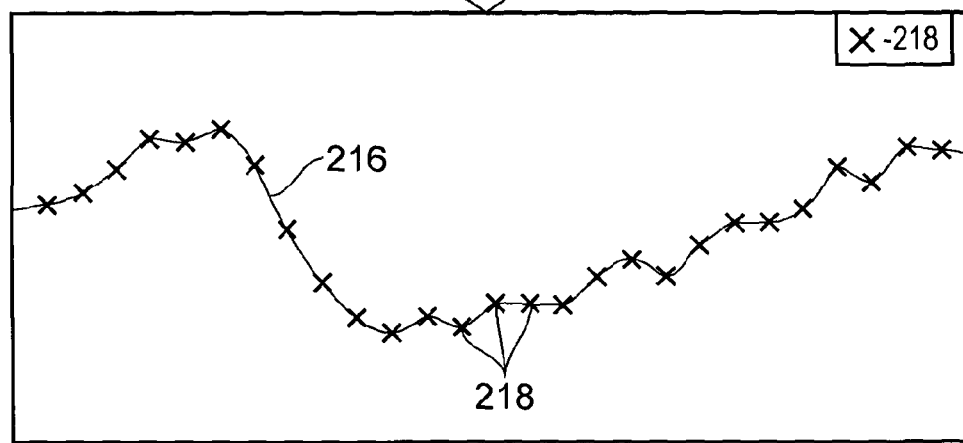
Figure 8C:
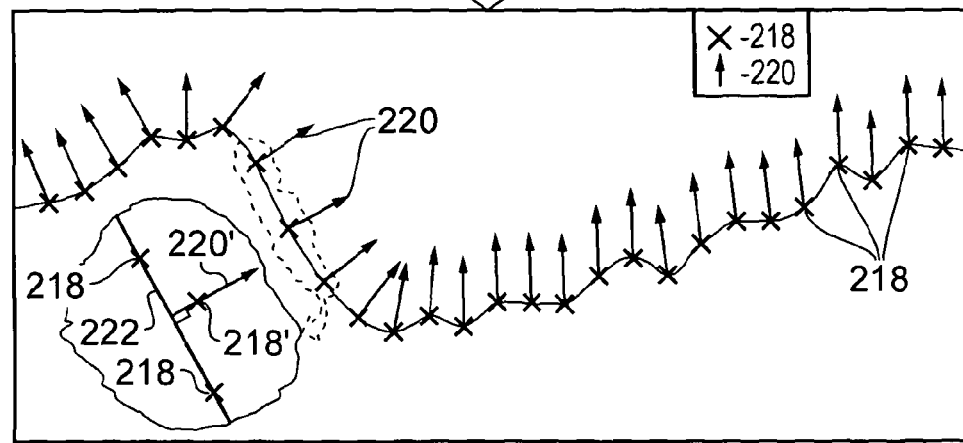
Figure 9A:
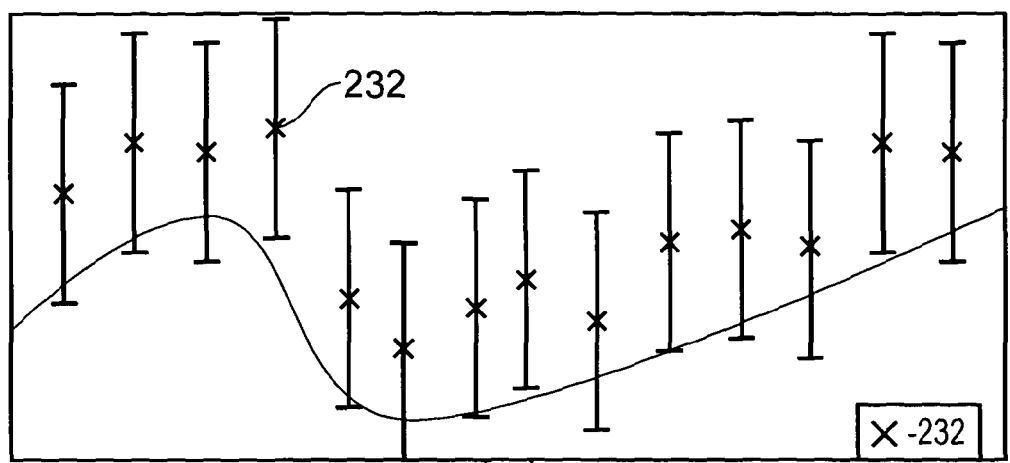
Figure 9B:
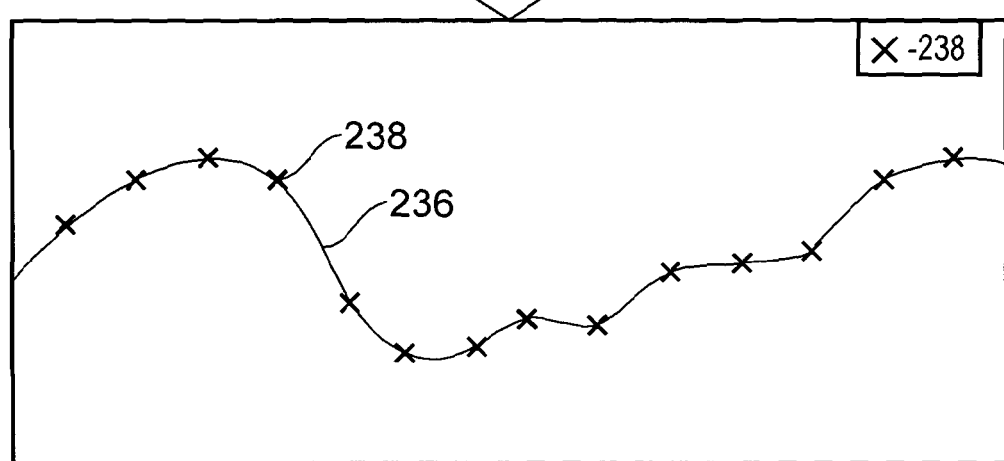
Figure 10:
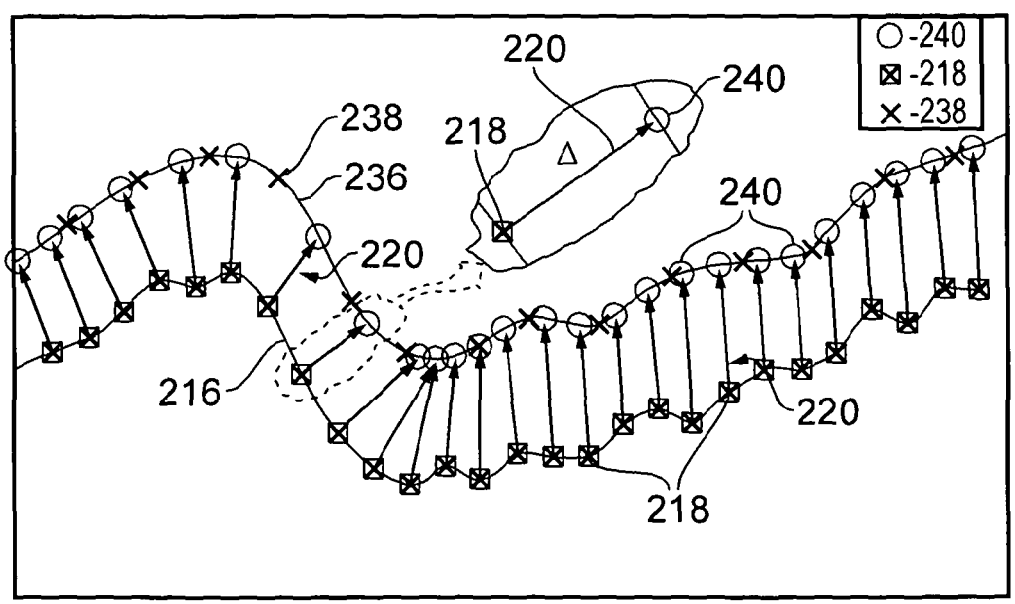
Figure 11:
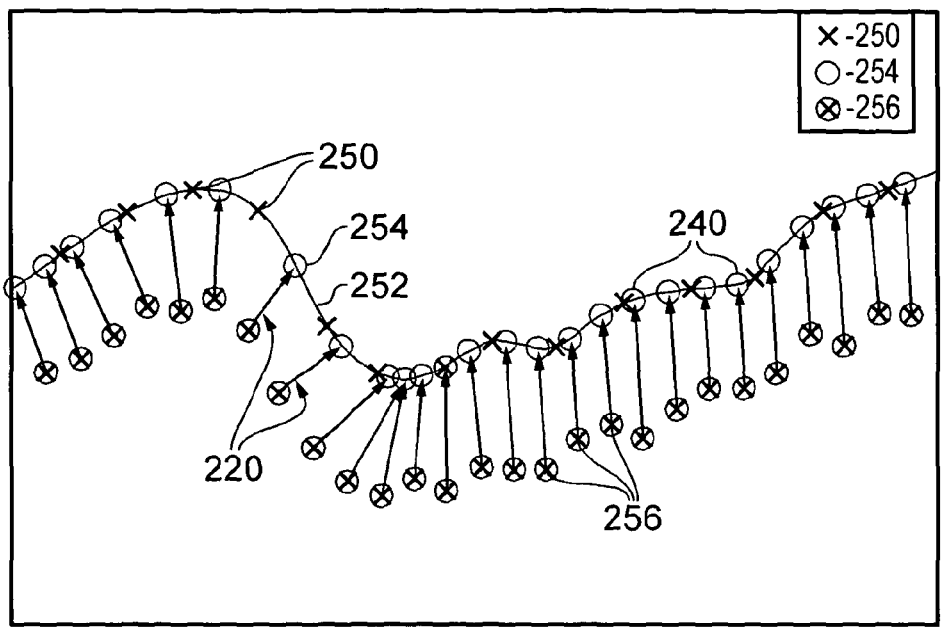
Figure 12:
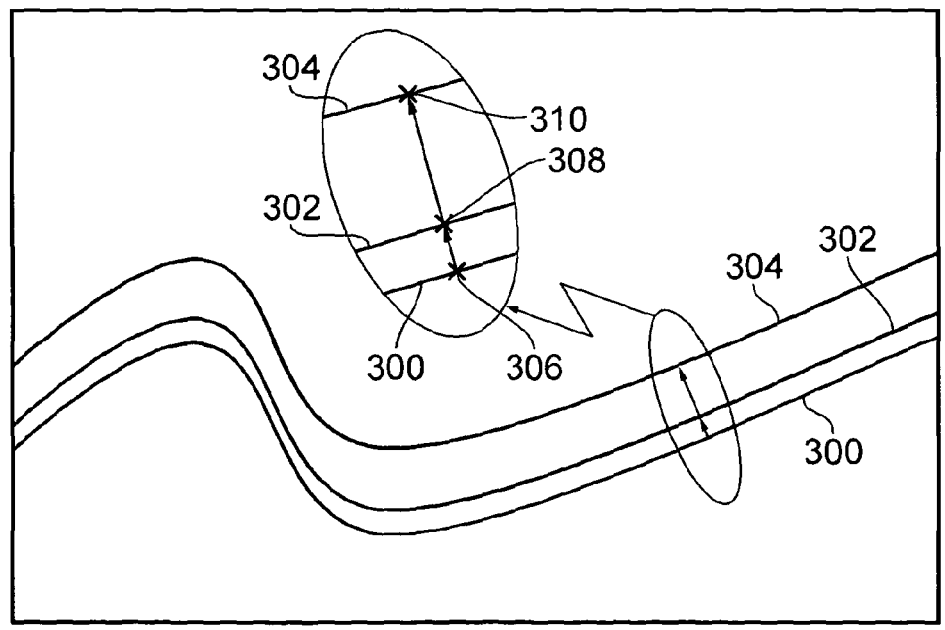

The invention will now be described, by way of example only, with reference to the accompanying drawings in which;

FIG. 1 illustrates parallel coordinate positioning apparatus,

FIG. 2 shows the parallel positioning mechanism of the apparatus of FIG. 1 in more detail, FIG. 3 shows a serial coordinate measuring machine, FIG. 4 illustrates an object comprising a bore and a datum surface, FIGS. 5a-5c show the steps involved when measuring the object of FIG. 4 using coordinate positioning apparatus, FIG. 6 illustrates the generation of an error map in accordance with the present invention for measurements taken on the bore shown in FIG. 4, FIG. 7 shows an object having a freeform surface, FIGS. 8a-8c illustrate the steps involved when measuring the object of FIG. 7 using the serial coordinate positioning apparatus of FIG. 3, FIGS. 9a-9b illustrate the steps involved when measuring the object of FIG. 7 using the parallel coordinate positioning apparatus of FIGS. 1 and 2, FIG. 10 illustrates the generation of an error map in accordance with the present invention for measurements taken on the object shown in FIG. 7, FIG. 11 shows the correction of subsequently acquired data using the error map of FIG. 10, and FIG. 12 illustrates the principle of a two stage correction process of the present invention.

Referring to FIG. 1, a parallel coordinate positioning apparatus is shown. The apparatus comprises a bed 2 fixed to an upper or base platform 4 by a plurality of support struts 6. The support struts 6 are sufficiently rigid to ensure the base platform 4 is held in a fixed position relative to the bed 2. The base platform 4 is also attached to a moveable platform 8 by a constrained parallel positioning mechanism 10. For clarity, details concerning the parallel positioning mechanism 10 are omitted from FIG. 1 and the mechanism is shown in detail in FIG. 2. The base platform 4, moveable platform 8 and parallel positioning mechanism 10 thus form a constrained parallel positioning machine that controls translational movement of the moveable platform 8 along three axes (X,Y,Z).

The moveable platform 8 carries a measurement probe 18 having a deflectable stylus 20. A part 24 to be measured by the measurement probe 18 is also shown placed on the bed 2 of the apparatus. A computer controller 22 is provided for controlling operation of the apparatus, in particular for controlling motion of the moveable platform 8 and for receiving measurement data from the measurement probe 18.

The measurement probe 18 may be an SP25 probe as sold by Renishaw plc, Wotton-under-Edge, Gloucestershire, UK. The SP25 measurement probe is a so-called scanning probe or analogue probe that outputs measurements of stylus tip deflection in its local coordinate system. The probe 18 is moved (i.e. by movement of the moveable platform 8) so that the stylus tip traces a path on the surface of the part 24. The controller 22 receives stylus tip deflection data from the measurement probe 18 and data from the parallel coordinate positioning apparatus relating to the position of the measurement probe. These are combined to enable the position of multiple points on the surface of the part to be found in the machine coordinate system (i.e. relative to a fixed point or origin of the machine).

Although the present example shows an analogue measurement probe, it would also be possible to take measurements using a so-called touch trigger probe that outputs a trigger signal whenever the stylus is deflected. If such a touch trigger probe was used, the stylus would be driven into contact with a plurality of different points on the surface of the part. Data relating to the position of the measurement probe when the trigger signal is issued can then be used to establish the position of the surface contact points. It should also be noted that although the measurement probe 18 is a contact probe, it would also be possible to use a non-contact (e.g. an optical, inductive, capacitive etc) measurement probe instead.

Referring to FIG. 2, the constrained parallel positioning mechanism used in the apparatus of FIG. 1 will now be described in more detail, noting that the illustration of the constrained parallel positioning mechanism given in FIG. 2 is inverted (i.e. upside down) compared with the view of FIG. 1.

The constrained parallel positioning mechanism comprises a base platform 4 that is mounted to a moveable platform or stage 8 by a plurality of struts. In particular, the base platform 4 and moveable platform 8 are linked by three powered telescopic struts 40, the ends of which are connected to the respective platforms by pivot joints. Each powered telescopic strut 40 has a motor 42 to increase or decrease its length and a position encoder (contained within the motor housing and therefore not visible in FIG. 2) to measure its length. Three anti-rotational devices 44 are also provided to constrain the three rotational degrees of freedom between the base platform 4 and the moveable platform 8; it should be noted that the anti-rotational devices are passive and comprise no motor or other type of actuator. Extension of the powered telescopic struts 40 of the machine thus provides only translational (not rotational) movement between the base platform 4 and the moveable platforms 8. In other words, the moveable platform 8 can be translated in space relative to the fixed based platform 4 and such translation may be described in terms of movement along X, Y and Z axes. The controller 22 as shown in FIG. 1 thus activates the various motors that extend and retract the powered telescopic struts 40 to move the measurement probe 18 and also receives feedback from the position encoders relating to strut extension from which the moveable platform, and hence the measurement probe, position can be determined.

Referring to FIG. 3, a serial coordinate measuring machine 102 is shown. As described in more detail below, CMM 102 may be used as a reference measurement machine. The CMM 102 comprises a base or table 104 on which an object (e.g. a part such as part 24 described above) can be placed and a gantry 106 that is moveable along x and y directions with respect to the base 104. The gantry 106 includes a quill 108 which is moveable along a z direction with respect to the gantry 106. Position encoders are provided on each axis of the CMM 102 to measure the position of the quill in the x, y, and z directions. It can be seen that the three (x,y,z) axes of CMM movement are built-up in a serial manner.

The quill 108 carries an indexing probe head 110, such as a Renishaw PH10 motorised probe head. The indexing probe head 110 comprises a base attachment portion that is attached to the quill 108 and a probe attachment portion that carries a scanning probe 112 having a deflectable stylus 114. The scanning probe 112, which may comprise a Renishaw SP25 probe, includes internal transducers that measure any deflection of the stylus 114 away from a so-called neutral or rest position. Any deflection of the stylus 114 is thus measured by the scanning probe 112 in its local (probe) coordinate (a,b,c) system. To improve the ability to scan complex objects, the indexing probe head 110 allows the scanning probe 112 to be rotated, relative to the quill, about the orthogonal axes A1 and A2 and locked in any one of multiple indexed positions. In the case of a Renishaw PH10 probe head, the probe may be indexed into any one of 720 different indexed positions. A controller 116 controls operation of the CMM.

Referring to FIG. 4, a simple part 140 to be measured is shown. The part 140 comprises a cylindrical bore 142 and a pair of datum surfaces 144a and 144b. The part 140 thus has a cylindrical bore 142 having a nominal radius at a certain bore depth. The datum surfaces 144a and 144b provide a reference or datum position for any measurements of the bore 142.

Referring to FIGS. 5a-5c, the first stage in the data collection and analysis process for measuring the part 140 described with reference to FIG. 4 is illustrated.

FIG. 5a shows the results of a first (measurement) step in which the part 140 is placed on a serial coordinate positioning apparatus of the type described with reference to FIG. 3. The serial coordinate positioning apparatus may be accurately calibrated using known techniques and may be located in a controlled (e.g. clean and temperature stable) environment. The serial CMM is used to collect multiple data or measurement points 152 on the inner surface of the cylindrical bore 142. The nominal shape of the surface is also shown in FIG. 5a by the dashed line 150. The position uncertainty associated with each measurement point 152 is also shown in FIG. 5a by error bars.

It should be noted that each collected measurement points 152 would typically comprise a position described in the (x,y,z) coordinate system of the parallel CMM. For ease of understanding, the illustrations of FIG. 5a shows only two dimensions (i.e. the illustrated measurement points lie in a single plane). It should also be noted that, for clarity, only a section of the bore is illustrated in FIG. 5a and that the measurement points taken on the datum surfaces are omitted.

Referring next to FIG. 5b, a filtering or smoothing step is performed on the measured data points 152. For example, a recursive filter is applied to the measurement points 152 to provide the filtered data points 162 shown in FIG. 5b that lie on the filtered curve 156. The filtered data points 162 are located at arbitrary positions around the circumference of the cylindrical bore and the density and distribution of the points 162 depends on the configuration of the coordinate positioning apparatus. It should be noted that the filtering process applied to the data shown in FIG. 5a is relatively weak and in practice a stronger filtering effect would most likely be implemented.

Referring to FIG. 5c, it is shown how the filtered data points 162 can be interpolated to generate interpolated data points 176 at predefined angular positions on the internal surface of the bore relative to the datum surfaces 144a and 144b. For example, a zero angular position 172 may be defined by the intersection of the surface normal of the datum surface 144a with the central axis 174 of the bore. Interpolated measurement points 176 may then be calculated at certain defined angular positions 171 relative to the zero position 172.

In a second stage of the process, the part 140 is removed from the serial coordinate positioning apparatus and located on parallel coordinate positioning apparatus as described with reference to FIGS. 1 and 2. The parallel coordinate positioning apparatus may be completely uncalibrated or may be calibrated to a relatively low accuracy (e.g. an accuracy below that which is acceptable for measurement purposes). The above described process is then repeated using the parallel coordinate positioning apparatus instead of the serial coordinate positioning apparatus. In particular, the parallel coordinate positioning apparatus is used to collect measurement data on the internal surface of the bore and the datum surface. This data is then filtered in the manner described above. An interpolation step is then performed in which surface measurement points are generated at the same angular orientations (i.e. defined relative to the datum surface) that were used in the interpolation process of the serial coordinate positioning apparatus.

Although an interpolation process is described for both sets of data (i.e. serial CPA and parallel CPA) it should be noted that would also be possible to interpolate only one set of data to align it with the other set. It should also be remembered that, as described in more detail above, alternatives to such interpolation processes are also possible.

Referring to FIG. 6, a third stage in the process is shown in which data collected using the serial coordinate positioning apparatus is compared to that collected using the parallel coordinate positioning apparatus. In particular, FIG. 6 shows interpolated data points 176 acquired using the serial coordinate positioning apparatus and the associated filtered data fit line 156. In addition, FIG. 6 shows interpolated data points 182 acquired using the parallel coordinate positioning apparatus along with the associated filtered data fit line 184. The defined angular positions 171 are also shown.

FIG. 6 thus shows corresponding pairs of interpolated data points that describe the position of a point on the bore surface as measured using the serial and parallel coordinate positioning apparatus. In particular, pairs of points 176 and 182 are shown that relate to the same angular position on the internal surface of the bore as measured using the serial and parallel coordinate positioning apparatus respectively. Difference or error values $\Delta_1$-$\Delta_3$ between the pairs of points 184 and 186 can thus be established. Such error values $\Delta$ thus describes the positional difference along the local surface normal of the bore surface for a plurality of angular positions. An error value is thus derived for each corresponding pair of interpolated points 176 and 182 and such error values are stored, along with the associated angular information, as an error map.

As explained above, the serial coordinate positioning apparatus is fully calibrated and can be considered to a good approximation to provide true or reference position measurements. The error values of the error map thus provide the positional uncertainties that are present when using the parallel coordinate positioning apparatus to measure the part 140. If the same parallel coordinate positioning apparatus is used to measure another part that is nominally identical to the part 140, the above described filtering and interpolation process can be performed on the collected measurement data to obtain measured data points at positions (defined relative to the datum surface) that correspond to those of the error values of the error map. The error values contained in the error map can thus be applied to each of the interpolated data points thereby correcting such data points to account for inaccuracies of the parallel coordinate positioning apparatus. In other words, each error value can be used to shift an interpolated data point along the surface normal thereby removing or reducing the errors in such measurements that arise from inaccuracies in the parallel coordinate positioning apparatus.

In the above example, the geometry of the part 140 is used to enable error values to be defined along the local surface normal. In others words, knowledge of the part geometry provides the link between the measurements acquired on different apparatus and also provides the surface normal information that is used in the generation and use of the error values contained in the error map. For example, when measuring a bore surface normal information can be obtained from the fit (e.g. a central axis of the bore can be found from the points measured on the internal surface of the bore thereby providing the required surface normal information). A variant of the method can, however, also be applied to so-called freeform surfaces having no standard geometrical properties.

Referring to FIG. 7, a part 200 is shown having a freeform surface 202. It will now be described with reference to FIGS. 8 to 12 how such a surface 202 can be measured.

Referring to FIGS. 8a-8c, a first stage of the process is illustrated in which the surface 202 of the part 200 is measured using a serial (reference) coordinate positioning apparatus.

As shown in FIG. 8a, an initial measurement step comprises using the serial coordinate positioning apparatus to measure the position of a plurality of points 212 on the surface 202 of the part 200. The uncertainty associated with each measurement point 212 is shown by the error bars. The nominal profile 210 of the surface 202 is also shown.

Referring to FIG. 8b, a filtering step is then performed. This filtering step uses a recursive filter to smooth the measurement points 212 to produce a series of filtered data points 218 that lie on a filtered surface or curve 216. Instead of a recursive filter, other suitable filtering techniques could be used (e.g. a smoothing filter, rolling average filter etc).

Referring to FIG. 8c, the surface normal vectors 220 associated with each filtered point 218 are established. The surface normal vectors 220 may be found before, during or after the filtering process. For example, the surface normal vectors may be known from the original inspection plan. Preferably, the surface normal vectors are found during the filtering process. The surface normal data may be calculated in a number of alternative ways. The surface normal vectors may, for example, be established from the normal of a line joining two adjacent filtered points.

Alternatively, as shown in the inset to FIG. 8c, a line 222 may be defined using two filtered points 218 located on either side of a target filtered point 218'. The surface normal vector 220' for the target filtered point 218' may then be defined as the vector that is orthogonal to the line 222 and intersects the target filtered point 218'. The positions of the filtered points 218 and the information describing the associated surface normal vectors 220 are stored.

Referring to FIGS. 9a and 9b, a second stage of the process is illustrated in which the surface 202 of the object 200 is measured using a parallel coordinate positioning apparatus. In this example, the parallel coordinate positioning apparatus is the apparatus to be error corrected and thus has relatively large uncertainties associated with acquired measurements. It should be noted, however, that the uncertainties are not random and that the acquired measurements have a high level of repeatability.

FIG. 9a illustrates the measurements taken using the parallel coordinate positioning apparatus. In particular, FIG. 9a shows the measured position of a plurality of points 232 on the surface 202 of the part 200. The nominal surface profile 210 of the part is also shown. The uncertainties associated with such measured points 232 are shown by the associated error bars. As can be seen by comparison to FIG. 8a, the data points 232 taken with the parallel coordinate positioning apparatus are taken at different locations and at a different density than the points measured using the serial coordinate positioning apparatus.

FIG. 9b shows a series of filtered points 238 that are derived from the measured points 232 by a filtering process. The same, or a different, filtering process may be applied to measurements of the parallel and serial coordinate positioning machines. The series of filtered data points 238 lie on the filtered surface or curve 236.

Referring to FIG. 10, the results of the measurements of surface 202 taken using both the serial and parallel coordinate positioning apparatus are shown. In particular, the filtered measurement points 218 and surface normal vectors 220 measured using the serial coordinate positioning apparatus are shown along with the filtered measurement points 238 acquired using the parallel coordinate positioning apparatus. A suitable fitting process (e.g. least sum of squares) may be performed to align the data from the respective coordinate positioning apparatus in the manner shown.

An interpolation process is then performed on the filtered measurement points 238 to generate interpolated measurement points 240 located on the surface normal vectors 220 associated with the filtered measurement points 218. The interpolation process may include, for example, linear interpolation, polynomial (e.g. cubic) interpolation or a rolling interpolation. The number of points used in the interpolation will set the accuracy of the interpolated measurement points. As shown in more detail in the inset of FIG. 10, error correction values A along the surface normal vectors 220 are used to describe the positional differences in measurements taken using the serial and parallel coordinate positioning apparatus. The various error correction values Δ and associated surface normal vectors are stored as an error map.

Referring to FIG. 11, use of the above mentioned error map will now be described when using the parallel coordinate positioning apparatus to measure the surface of a further object that is nominally identical to the surface 202.

Firstly, the parallel kinematic coordinate positioning apparatus is arranged to measure multiple points on the surface of the object. These measured points are then filtered to provide a series of filtered data points 250 that lie on the filtered curve 252. An interpolation process (e.g. of the type described above) is then performed to generate interpolated measured points 254 on the curve 252 and also intersect the surface normal vectors 220 of the previously generated error map described with reference to FIG. 10.

The error correction values of the error map are applied to the interpolated points 254 to generate corrected measurement points 256. In other words, the position of each interpolated measured points 254 is shifted along the surface normal vector 220 by the associated error value Δ. In this manner, the positional uncertainties associated with the parallel coordinate positioning apparatus are reduced and the measurement accuracy approaches that of the serial coordinate positioning apparatus.

The above examples describe a process of error map generation in which measurements taken with a parallel coordinate positioning apparatus are compared with measurements from a (pre-calibrated) serial coordinate positioning apparatus that is assumed to provide true measurement values. It is, however, important to note that the method could be used to generate an error map between any two data sets describing a particular surface. For example, the error map may be generated for data sets acquired using any two different coordinate positioning apparatus or for different configurations of the same coordinate positioning apparatus. Furthermore, one of the data sets that describe the surface may be generated from design data rather than being directly measured.

The surface normal information may also be defined in different ways to those described above. For example, the method described above with reference to FIGS. 7 to 11 uses a surface normal vector 220 that is derived from the measurements taken using the serial coordinate positioning apparatus. The surface normal data may alternatively be defined using the filtered measurements taken using the parallel coordinate positioning apparatus. In a further alternative, the surface normal data could be defined using nominal surface shape information derived from design data in a similar manner to the process applied to the known geometry bore described with reference to FIGS. 4 to 6. In such an example, the data of both the serial and parallel coordinate positioning apparatus could be interpolated to lie on the nominal surface normal vector of the design data.

It should also be noted that more than one error map may be created to correct measurements. Such a process will now be described in more detail.

Referring to FIG. 12, a dual error mapping process is illustrated. In particular, FIG. 12 shows a design surface profile 300 for an object that is formed from multiple data points created using a computer design package, a reference surface profile 302 that has been measured using a serial (reference) coordinate position apparatus on a part made to the relevant design and a surface profile 304 of the same part as measured using a parallel coordinate positioning apparatus. Each of the surface profiles 300, 302 and 304 comprises multiple data points; examples of such data points are only shown in the inset to FIG. 12.

The correction process described above with reference to FIGS. 7-11 can thus be used to generate a first error map comprising surface normal vectors and correction values along the surface normal that describe the positional differences between points measured using the serial and parallel coordinate positioning apparatus; e.g. between points 308 and 310. A second error map may also be generated in an analogous manner to map positional differences between points on the reference surface profile 302 and the design surface profile 300; e.g. between points 306 and 308. The first error map thus corrects for differences between measurements taken with the serial and parallel coordinate positioning machines whilst the second error map accounts for differences between design data and the measurements taken with the serial coordinate positioning machine. In this manner, subsequent measurements of objects taken using the parallel coordinate positioning apparatus can be mapped back to the reference coordinate positioning apparatus using the first error map and then back to the design data using the second error map. Measurements acquired using the parallel coordinate measurement apparatus can thus be mapped back onto design data.

The methods described above with reference to the various drawings demonstrate how an error map produced for a first part can be used to, for example, correct measurements of other (e.g. nominally identical) parts. The error map may, however, also be used to correct subsequent processes that form or somehow alter a part. For example, the various errors values contained in the error map may be used to provide a point-by-point correction for a part that is to be manufactured from a blank. This may be achieved by, for example, altering CAD data using the error map so that updated machining instructions (e.g. machine tool command codes) can be created. These updated instructions may thus allow the various error corrections to be incorporated into the machining process. Similarly, the error map may be used to define where extra material needs to be added to a part. For example, the error map may be used in a turbine blade refurbishment process to define where extra material needs to be added to the turbine blade.

It should again be remembered that the above described methods are merely two dimensional examples of the present invention whereas the techniques are likely to be applied to three dimensional shapes in practice. Furthermore, the various positional uncertainties are greatly exaggerated in the various drawings whilst the density of collected points is much lower than would be typically collected. The above example are thus merely illustrative examples and should in no way be seen to limit the scope of the present invention.

The invention claimed is:

1. An error correction method for a coordinate positioning apparatus, the method comprising the steps of:
   (i) taking a first data set comprising one or more first data values derived from measurement of a first object by a first coordinate positioning apparatus, each first data value describing a position on the surface of the first object;
   (ii) taking a second data set comprising one or more second data values derived from measurement of the first object by a second coordinate positioning apparatus, each second data value describing a position on the surface of the first object;
   (iii) calculating an error map comprising one or more error values, each error value describing a positional difference between the surface of the first object as described by the first data set and the surface as described by the second data set,
   the surface normal of the first object being known at each position described by each first data value and each error value being calculated by determining the positional difference substantially in the direction of the known surface normal; and
   (iv) using the second coordinate positioning apparatus to perform a processing or measurement operation on the first object, or an object nominally identical to the first object, in which positions on the surface thereof are corrected using the error map calculated in step (iii).

2. A method according to claim 1, wherein:
   step (iv) comprises the steps of taking a series of further objects that are nominally identical to the first object and using the second coordinate positioning apparatus to measure each of the series of further objects, and the error map is used to correct the measurement of each of the further objects.

3. A method according to claim 1, wherein:
   step (iv) comprises the step of performing a processing operation to alter the surface shape of the first object or the object nominally identical to the first object, and
   the error map is used to adjust the surface shape produced by the processing operation.

4. A method according to claim 3, wherein the processing operation comprises adding material to, or removing material from, the first object or the object nominally identical to the first object.

5. A method according to claim 1, further comprising the step of generating the one or more first data values and/or the one or more second data values using an interpolation process that ensures each second data value lies on the known surface normal of a first data value,
   wherein each error value calculated in step (iii) comprises the positional difference between a first data value and its associated second data value along the known surface normal.

6. A method according to claim 1, comprising, for each of a plurality of first data values, the steps of:
   defining a plane that includes a selected first data value and is orthogonal to the known surface normal thereof;
   projecting at least some of the second data values along the known surface normal of the selected first data value and determining the position at which the second data value projections intersect the defined plane;
   establishing which one of the second data value projections intersects the defined plane at an intersection point that is closest to the selected first data value; and
   calculating the error value from the positional difference between the closest intersection point and the associated second data value from which it was projected.

7. A method according to claim 1, wherein the second coordinate positioning apparatus comprises a measurement probe.

8. A method according to claim 1, wherein the first coordinate positioning apparatus comprises a calibrated coordinate measurement machine, and the first data set is derived from measurement of the first object by the first coordinate positioning apparatus.

9. A method according to claim 8, further comprising the step of calculating the surface normal of the first object at each position described by the first data values using the points measured on the surface of the first object by the first coordinate positioning apparatus.

10. A method according to claim 8, wherein:
    the first object has a known geometric form, and
    the method further comprises the step of using the first coordinate positioning apparatus to perform a datuming operation to establish the orientation of the first object such that the surface normal of the first object is known at each position described by the first data values.

11. A method according to claim 1, wherein the second coordinate positioning apparatus comprises a parallel coordinate positioning apparatus.

12. A method according to claim 1, wherein:
    step (ii) comprises using an interpolation process to calculate the one or more second data values from the positions of a plurality of points on the surface of the first object as measured by the second coordinate positioning apparatus, and
    each second data value calculated in step (ii) is arranged to lie on the surface normal of a first data value.

13. A method according to claim 1, further comprising the steps of:
    taking a third data set comprising one or more third data values, each third data value describing a position on the surface of the first object; and
    calculating a second error map comprising one or more error values, each error value describing a positional difference between a second data value and a third data value, the positional difference being determined substantially in the direction of the known surface normal associated with the first data value.

14. A method according to claim 1, wherein the second coordinate positioning apparatus has a lower accuracy than the first coordinate positioning apparatus.

15. An error correction method for a coordinate positioning apparatus, the method comprising the steps of:
    (i) taking a first data set comprising one or more first data values derived from design data associated with a first object, each first data value describing a position on the surface of the first object;
    (ii) taking a second data set comprising one or more second data values derived from measurement of the first object by a second coordinate positioning apparatus, each second data value describing a position on the surface of the first object;
    iii) calculating an error map comprising one or more error values, each error value describing a positional difference between the surface of the first object as described by the first data set and the surface as described by the second data set, the surface normal of the first object being known at each position described by each first data value, and each error value being calculated by determining the positional difference substantially in the direction of the known surface normal; and (iv) using the second coordinate positioning apparatus to perform a processing or measurement operation on the first object, or an object nominally identical to the first object, in which positions on the surface thereof are corrected using the error map calculated in step (iii).

16. An error correction method for a coordinate positioning apparatus, the method comprising the steps of:
(i) taking a first data set comprising one or more first data values, each first data value describing a position on the surface of a first object;
(ii) taking a second data set comprising one or more second data values derived from measurement of the first object by a coordinate positioning apparatus, each second data value describing a position on the surface of the first object;
(iii) calculating an error map comprising one or more error values, each error value describing a positional difference between the surface of the first object as described by the first data set and the surface as described by the second data set, the surface normal of the first object being known at each position described by each first data value, and each error value being calculated by determining the positional difference substantially in the direction of the known surface normal; and
(iv) using the coordinate positioning apparatus to perform a processing or measurement operation on at least one further object that is nominally identical to the first object, the positions on the surface of each further object being corrected using the error map calculated in step (iii).

17. A method according to claim 16, wherein:
the at least one further object comprises a series of further objects, and
step (iv) comprises using the coordinate positioning apparatus to measure each of the series of further objects, the error map being used to correct the measurement of each of the series of further objects.

18. A method according to claim 16, further comprising the step of generating the one or more first data values and/or the one or more second data values using an interpolation process that ensures each second data value lies on the known surface normal of a first data value,
wherein each error value calculated in step (iii) comprises the positional difference between a first data value and its associated second data value along the known surface normal.

19. A method according to claim 16, comprising, for each of a plurality of first data values, the steps of:
defining a plane that includes a selected first data value and is orthogonal to the known surface normal thereof;
projecting at least some of the second data values along the known surface normal of the selected first data value and determining the position at which the second data value projections intersect the defined plane;
establishing which one of the second data value projections intersects the defined plane at an intersection point that is closest to the selected first data value; and
calculating the error value from the positional difference between the closest intersection point and the associated second data value from which it was projected.

20. A method according to claim 16, wherein the coordinate positioning apparatus comprises a parallel coordinate positioning apparatus.

* * * * *